(12) United States Patent
Simon et al.

(10) Patent No.: US 8,016,964 B2
(45) Date of Patent: Sep. 13, 2011

(54) SYSTEM TO PREVENT OVERLOADS FOR ULTRASONIC STAKING APPLICATIONS

(75) Inventors: William P. Simon, New Milford, CT (US); Michael S. Stefansen, Danbury, CT (US)

(73) Assignee: Sonics & Materials Inc., Newtown, CT (US)

( * ) Notice: Subject to any disclaimer, the term of this patent is extended or adjusted under 35 U.S.C. 154(b) by 158 days.

(21) Appl. No.: 12/434,818

(22) Filed: May 4, 2009

(65) Prior Publication Data

US 2009/0272480 A1 Nov. 5, 2009

Related U.S. Application Data

(60) Provisional application No. 61/050,023, filed on May 2, 2008.

(51) Int. Cl.
*B32B 37/00* (2006.01)
(52) U.S. Cl. ....... 156/64; 156/73.1; 156/359; 156/580.2
(58) Field of Classification Search ............... 156/64, 156/73.1, 359, 580.1, 580.2; 228/1.1, 110.1; 264/442–445; 425/174.2; 310/321, 323.01, 310/323.18, 334
See application file for complete search history.

(56) References Cited

U.S. PATENT DOCUMENTS

| 3,784,079 | A |   | 1/1974  | Spanjer |                |
|-----------|---|---|---------|---------|----------------|
| 4,746,051 | A |   | 5/1988  | Peter   |                |
| 4,859,378 | A | * | 8/1989  | Wolcott | ......... 264/445 |
| 4,865,680 | A | * | 9/1989  | Pierson | ......... 156/580.2 |
| 4,865,687 | A | * | 9/1989  | Pierson | ......... 156/73.1 |
| 5,085,719 | A |   | 2/1992  | Eck     |                |
| 5,213,249 | A |   | 5/1993  | Long et al. |         |
| 5,366,580 | A |   | 11/1994 | Czach   |                |
| 5,435,863 | A |   | 7/1995  | Frantz  |                |
| 5,637,947 | A |   | 6/1997  | Kising et al. |       |
| 5,846,377 | A | * | 12/1998 | Frantz et al. | ......... 156/359 |
| 6,617,548 | B1 |  | 9/2003  | Bosio   |                |
| 7,225,965 | B2 |  | 6/2007  | Johansen |               |
| 2007/0163349 | A1 | | 7/2007 | Johansen et al. |      |
| 2008/0054051 | A1 | | 3/2008 | Sheehan et al. |       |

OTHER PUBLICATIONS

International Search Report and Written Opinion of the International Searching Authority; PCT/US09/02751; Jun. 15, 2009; 8 pages.

* cited by examiner

*Primary Examiner* — James Sells
(74) *Attorney, Agent, or Firm* — St. Onge Steward Johnston & Reens LLC

(57) ABSTRACT

A system for performing an ultrasonic staking operation in order to join a first part having a post protruding therefrom and a second part having a hole through which the post is passed includes a horn having an end vibrating at a frequency in the ultrasonic range and a motion system operatively connected to the horn, the motion system being capable of selectively moving the horn toward and away from the parts. The motion system moves the horn, with the end of the horn in contact with the post, toward the parts at a first speed such that the ultrasonic vibrations of horn cause melting of the post, and once a determination is made that the end of the horn has contacted a surface of the second part, the motion system moves the horn toward the parts at a second speed, the second speed being slower than the first speed.

20 Claims, 4 Drawing Sheets

US 8,016,964 B2

SYSTEM TO PREVENT OVERLOADS FOR ULTRASONIC STAKING APPLICATIONS

CROSS-REFERENCE TO RELATED APPLICATIONS

This patent application claims the benefit, under 35 U.S.C. §119(e), of U.S. Provisional Patent Application Ser. No. 61/050,023, filed on May 2, 2008, which is hereby incorporated by reference herein.

FIELD OF THE INVENTION

This invention relates generally to ultrasonic staking for the joinder of parts. More specifically, the present invention relates to a system for ultrasonic staking that incorporates a control mechanism to prevent power overloads during the staking process.

BACKGROUND OF THE INVENTION

Ultrasonic staking is used in the automotive industry (as well as in other industries) to attach plastic components together. There are usually many points to be staked in order to make a finished part, sometimes one hundred or more.

Typically, ultrasonic staking machine builders normally build a switching system with high voltage relays to use one ultrasonic supply and several converters. In a multiplexed fashion, one converter is switched in and an ultrasonic mechanism is turned on to weld the first point, then successively the next converter is switched in and the ultrasonic mechanism is again turned on to weld the second point. This is repeated multiple times as necessary to finish all points to be welded on the dashboard or other component.

This multiplexed arrangement is desired because of the number of points to be welded. There is a tradeoff between speed and the number of power supplies applied to the project. More supplies will cost more and reduce the time to complete the task; fewer supplies will reduce the cost but add time to the task. It is very desirable to use the least number of supplies that will meet the time requirements and minimize the costs for components.

Power supply cost is directly related to the power rating of the supply. Higher wattage means higher cost. It is also desirable to use the lowest rated power supply as possible.

The ultrasonic heads are driven to the parts by stepper motor actuators (although air cylinders are also typically used). The speed of this movement is also important to completing the task on time. The faster the movement, the quicker the task is complete but increased power will be required from the supply. The applied force is proportional to the speed and heat available (i.e., power rating of the supply).

The application designer must carefully select the lowest power supply wattage, the fastest motor speed and the best number of multiplex channels to optimize the application cost and timing. At the same time, overloading of the power supplies must be avoided.

The usual solution to avoiding overloading of the power supplies is to add additional supplies or to move the motors a little slower so the force builds at a lower rate. Both options are undesirable resulting in higher cost or a longer time to complete the process. It is also undesirable to require a 1000-watt supply, for example, when in a common example 99% of the weld occurs at less than 100 watts.

Attempts have been made to obviate the problem of power supply overloading by shutting off the power supply and/or varying the power/frequency output of the power supply when certain conditions (such as an overload or impending overload condition).

For example, U.S. Pat. Nos. 5,846,377 to Frantz et al. and 5,435,863 to Frantz disclose ultrasonic processing apparatus wherein the motional amplitude of the horn is varied in response to the amount of power provided to a workpiece, among other possible parameters. In one specific embodiment, the apparatus is used for a staking operation creating a stronger bond and a more pleasing appearance than previously attained because of decreased splatter of thermoplastic material.

U.S. Pat. No. 7,225,965 to Johansen discloses an ultrasonic welding system in which weld energy or ultrasonic voltage is used to control the on/off state of an ultrasonic generator and/or flag bad or suspect parts.

U.S. Pat. No. 5,637,947 to Kising et al. discloses an ultrasonic welding system with frequency control based at least in part upon a measured current, voltage and/or power.

U.S. Pat. No. 5,366,580 to Czach discloses a high frequency welding machine which is tuned to maintain a constant output power and die temperature in response to various sensed parameters, including plate current and plate current overload, among others.

U.S. Pat. No. 5,213,249 to Long et al. discloses an ultrasonic bonding system that monitors adhesion and/or dehesion between two substrates by sensing voltage and current supplied to an ultrasonic source, and varies or turns on/off the power to the source in response thereto.

U.S. Pat. No. 4,746,051 to Peter discloses an ultrasonic welding apparatus that controls termination of welding and/or that evaluates the quality of welded parts based upon time period and energy level measured from the point in time where welding power exceeds a power threshold.

U.S. Pat. No. 3,784,079 to Spanjer discloses an ultrasonic welding device that shuts off an ultrasonic power supply when a dip in voltage is detected.

Thus, the references described above employ voltage, current and/or power sensing in the context of an ultrasonic or similar device to turn power on/off, to vary frequency or amplitude and/or to evaluate the quality of a part. While these approaches may have some advantages over not providing any type of overload protection at all, they suffer from disadvantages of their own. Turning off the power supply completely would greatly add to the time necessary to complete the staking operation (particularly where overload conditions are encountered regularly), or may even make it impossible to complete the staking at all. On the other hand, varying the frequency or amplitude adds complexity to the ultrasonic mechanism and may shorten the life expectancy thereof.

Therefore, no ultrasonic staking system possessing satisfactory overload prevention is known in the prior art.

SUMMARY OF THE INVENTION

In this regard, one aspect of the present invention deals with a system for performing an ultrasonic staking operation in order to join a first part having a post protruding therefrom and a second part having a hole through which the post is passed. The system includes a horn having an end vibrating at a frequency in the ultrasonic range and a motion system operatively connected to the horn, the motion system being capable of selectively moving the horn toward and away from the first and second parts. The motion system moves the horn, with the end of the horn in contact with the post, toward the first and second parts at a first speed such that the ultrasonic vibrations of the end of the horn cause melting of the post, and once a determination is made that the end of the horn has contacted a surface of the second part surrounding the hole, the motion system moves the horn toward the first and second parts at a second speed, the second speed being slower than the first speed.

In some embodiments, the system further includes a power supply that supplies power necessary to cause the ultrasonic vibrations of the end of the horn. In certain of these embodiments, the determination that the end of the horn has contacted a surface of the second part surrounding the hole is made based upon a level of power required of the power supply in order to maintain the ultrasonic vibrations of the end of the horn. In certain embodiments, the determination that the end of the horn has contacted a surface of the second part surrounding the hole is made when the level of power required of the power supply in order to maintain the ultrasonic vibrations of the end of the horn is higher than a threshold value. In certain of these embodiments, the threshold value is variable by a user of the system.

In some embodiments, the power supply comprises a power detector and the determination that the end of the horn has contacted a surface of the second part surrounding the hole is made by the power detector. In certain of these embodiments, the power detector comprises a comparator. In some embodiments, the motion system comprises a stepper motor. In some embodiments, amplitude and frequency of the ultrasonic vibrations of the end of the horn are kept substantially constant during an entirety of the ultrasonic staking operation.

In accordance with another aspect of the present invention, a system for performing an ultrasonic staking operation in order to join a first part having a post protruding therefrom and a second part having a hole through which the post is passed includes a horn having an end vibrating at a frequency in the ultrasonic range, wherein amplitude and frequency of the ultrasonic vibrations of the end of the horn are kept substantially constant during an entirety of the ultrasonic staking operation. The system also includes a power supply that supplies power necessary to cause the ultrasonic vibrations of the end of the horn, the power supply comprising a power detector sensing an amount of power required to maintain the ultrasonic vibrations of the end of the horn, and a motion system operatively connected to the horn, the motion system being capable of selectively moving the horn toward and away from the first and second parts. The motion system moves the horn, with the end of the horn in contact with the post, toward the first and second parts at a first speed such that the ultrasonic vibrations of the end of the horn cause melting of the post if the amount of power required to maintain the ultrasonic vibrations of the end of the horn is below a threshold value. The motion system moves the horn toward the first and second parts at a second speed, the second speed being slower than the first speed, if the amount of power required to maintain the ultrasonic vibrations of the end of the horn is at or above the threshold value.

In some embodiments, the threshold value is indicative of a determination that the end of the horn has contacted a surface of the second part surrounding the hole. In some embodiments, the threshold value is variable by a user of the system. In some embodiments, the power detector comprises a comparator. In some embodiments, the motion system comprises a stepper motor.

In accordance with a further aspect of the present invention a method for performing an ultrasonic staking operation in order to join a first part having a post protruding therefrom and a second part having a hole through which the post is passed, includes the steps of: (i) vibrating an end of a horn at a frequency in the ultrasonic range, (ii) moving the horn, with the end of the horn in contact with the post, toward the first and second parts at a first speed such that the ultrasonic vibrations of the end of the horn cause melting of the post, (iii) determining when the end of the horn has contacted a surface of the second part surrounding the hole, and (iv) moving, once it has been determined that the end of the horn has contacted a surface of the second part surrounding the hole, the horn toward the first and second parts at a second speed, the second speed being slower than the first speed.

In some embodiments, the method further includes the step of supplying, with a power supply, power necessary to perform the vibrating step. In certain of these embodiments, the determining step is performed based upon a level of power required of the power supply in order to perform the vibrating step. In certain of these embodiments, the determining step comprises the step of determining when the level of power required of the power supply in order to perform the vibrating step is higher than a threshold value. In some embodiments, the vibrating step comprises the step of vibrating an end of a horn at a frequency in the ultrasonic range with an amplitude and frequency that are kept substantially constant during an entirety of the ultrasonic staking operation.

In accordance with another aspect of the present invention a method for performing an ultrasonic staking operation in order to join a first part having a post protruding therefrom and a second part having a hole through which the post is passed includes the steps of: (i) vibrating an end of a horn at a frequency in the ultrasonic range, with an amplitude and frequency that are kept substantially constant during an entirety of the ultrasonic staking operation, (ii) supplying power, with a power supply, necessary to perform the vibrating step, (iii) sensing an amount of power required of the power supply to perform the vibrating step, (iv) moving the horn, with the end of the horn in contact with the post, toward the first and second parts at a first speed such that the ultrasonic vibrations of the end of the horn cause melting of the post if the sensed amount of power is below a threshold value, and (v) moving the horn toward the first and second parts at a second speed, the second speed being slower than the first speed, if the sensed amount of power is at or above the threshold value.

The invention and its particular features and advantages will become more apparent from the following detailed description considered with reference to the accompanying drawings.

DETAILED DESCRIPTION OF THE INVENTION

Figure 1C:
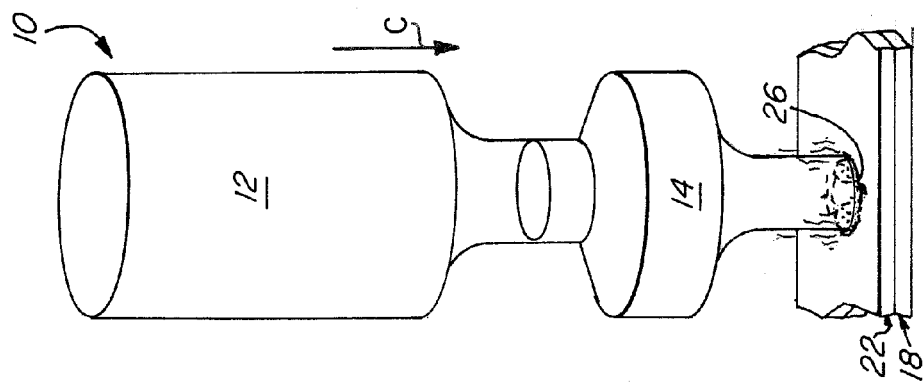
FIGS. 1A-1C schematically illustrate an ultrasonic staking operation as is known in the prior art.
Figure 1B:
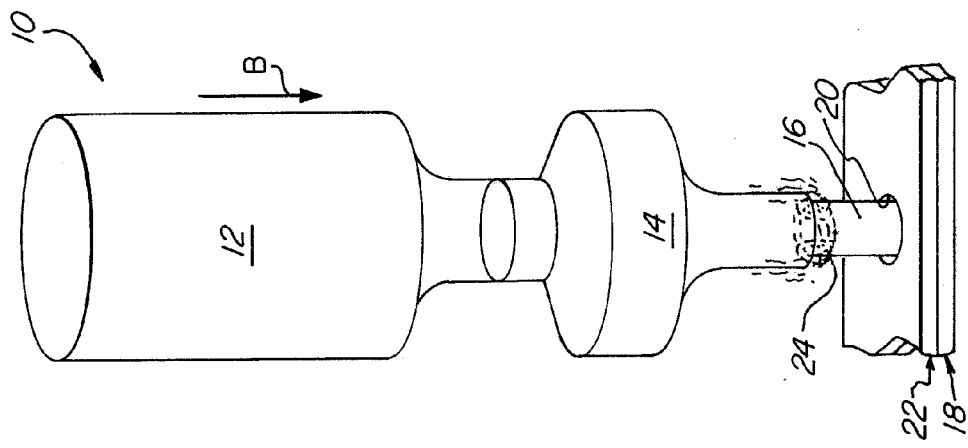
Figure 1A:
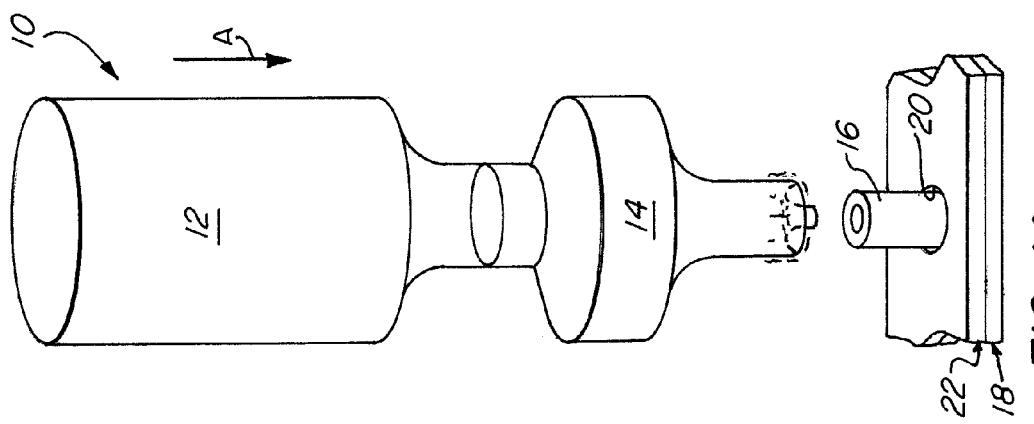

Referring first to FIGS. 1A-1C, a typical ultrasonic staking operation is schematically shown. An ultrasonic stack 10, including a converter 12 and a horn 14, is moveable with respect to the axis of a post 16 protruding from a first plastic part 18 and through a hole 20 in a second plastic part 22. The first plastic part 18 and the second plastic part 22 are to be joined together by ultrasonic staking.

Referring now specifically to FIG. 1A, the ultrasonic stack 10 is being moved downward (indicated by arrow A), but the horn 14 has not yet made contact with the post 16. Ultrasonic vibrations are being provided to the horn 14, but since it has not yet contacted the post 16, no resistance is being met and no pressure is being applied to the post 16. As such, the power required to vibrate the horn 14 is very low.

As shown in FIG. 1B, continued movement of the horn 14 (indicated by arrow B) brings the horn 14 into contact with the post 16. The ultrasonic vibrations of the horn 14 melt the end of the post 16 to create an area of molten plastic 24. Because the post 16 has a relatively small cross-sectional area, relatively little resistance is met by the horn 14 and therefore, only slightly higher power is required to maintain the ultrasonic vibrations thereof. The ultrasonics is easily melting the post 16 and the speed of travel is limiting the pressure applied. In the extreme, if the motor speed were increased beyond the point where the ultrasonics could keep the post 16 molten in front of the horn 14, then the pressure would build and the power would increase. Thus, as will be recognized, there is a maximum speed that can be used during the melting post 16 phase.

Referring specifically now to FIG. 1C, it will be seen that the post 16 has been almost completely melted and the outer edge of the horn 14 is contacting the upper surface of the second plastic part 22 as downward movement (indicated by arrow C) is continued. The area of applied pressure is now much larger because the molten plastic is captured in front of the horn 14 (like a hydraulic well) so the power climbs rapidly. It will climb rapidly to the overload level depending on the speed and supply rating. It is desired for the horn 14 to exert some pressure on the second plastic part 22 so that it can be ensured that a tight bond is formed between the first plastic part 18 and the second plastic part 22. As is known in the art, it is also desirable that the upper surface of the second plastic part 22 be partially melted so that a "witness ring" 26 is formed, the presence of which indicates that a tight bond has been created. However, as will be recognized, once the horn 14 contacts the upper surface of the second plastic part 22, the area of contact at the end of the horn 14 increases dramatically, thereby dramatically increasing the resistance met thereby, and consequently greatly increasing the power required to maintain the ultrasonic vibrations of the horn 14. It is at this point where the potential exists for overloading of the power supply.

In this regard, it has been confirmed that the overloads are real because the power required advances drastically at the very end of the weld timing. The increased power is related to the ultrasonic horn design for this particular type of application. As the horn melts the stake post and approaches the surface, the outer edge of the horn will contact the surface of the attached parts and increase the area of applied force. This increased area at the same advancing speed will increase the power above the overload protection setting.

It should be noted that FIGS. 1A-1C are representative of a horn design that would force a power change requirement as the weld progresses. There are many designs that would have the same influence, as will be apparent to those skilled in the art. Air cylinder systems or other types of motion system (instead of motor travel) would have the same type of impact by actively changing the pressure. Air would not have the same level of force control because of the cylinder volume but the effect could still be used to a lesser result. As such, use of a stepper motor to control travel of the stack 10 is preferred. The hydraulic nature of the sealed molten material and the horn 14 against the top surface of the second plastic part 22 allows a very rapid force change with the motor speed change.

Figure 2A:
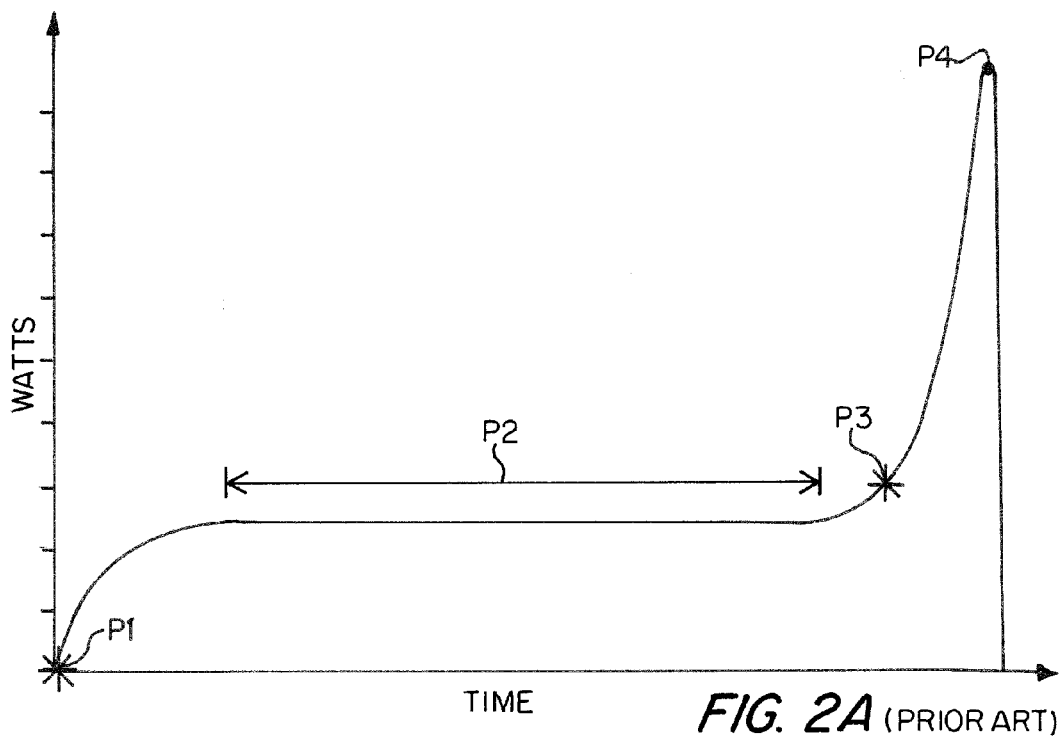
FIGS. 2A and 2B graphically illustrate, respectively, power requirement versus time and distance travelled versus time of an ultrasonic staking operation in accordance with prior art staking operations.
Figure 2B:
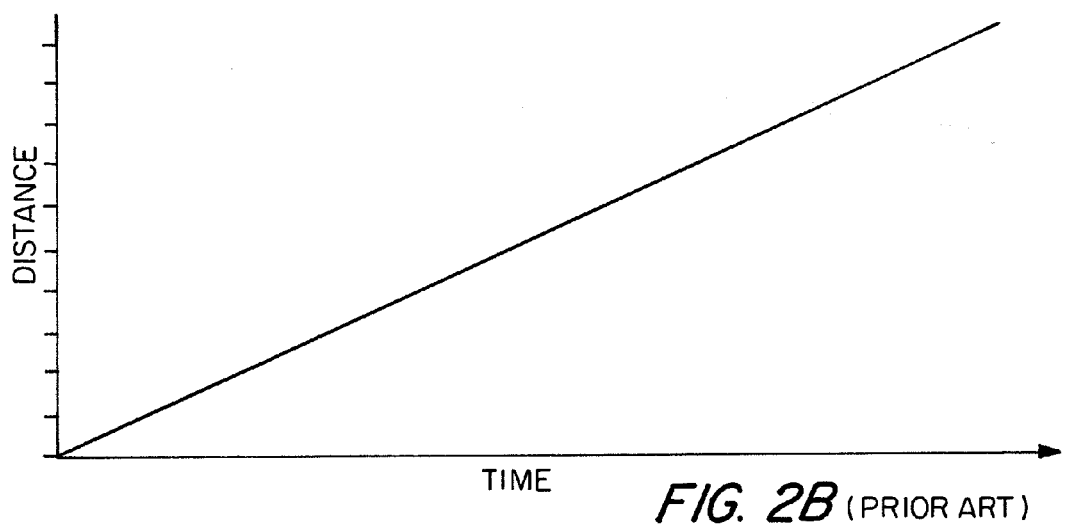

Referring now to FIGS. 2A and 2B, the problem of power overloading using prior art systems as the stack 10 (converter 12 and horn 14 assembly) is moved at constant velocity (as illustrated in FIG. 2B which shows linear distance versus time) through the weld is graphically shown. The power required is essentially zero until the horn 14 contacts the post 16 (indicated at P1), at which time there is an increased power requirement until the post 16 begins to melt. The power required substantially reaches a plateau (indicated by P2) as the stack 10 is moved downward and the post 14 continues to melt. This continues until the horn 14 contacts the surface of the second part 22 (indicated by P3), at which point the required power increases dramatically to the overload limit (indicated by P4) and the power supply is shut down.

The shutdown protects the supply from internal damage but does abort the weld cycle even though it occurs at the very end of the desired weld time so it appears as a completed, good weld. Quality control tends to use the "witness ring" appearance as an acceptable weld. This witness ring is the mark left in the top surface as the outer edge of the horn touches the part melting a ring shaped pattern. It is desirable to see this pattern as verification that the horn traveled all the way to the part capturing the pieces together properly. Such may not occur, however, when the power supply is shut down using a scheme of overload protection where the power supply is shut down.

Figure 3A:
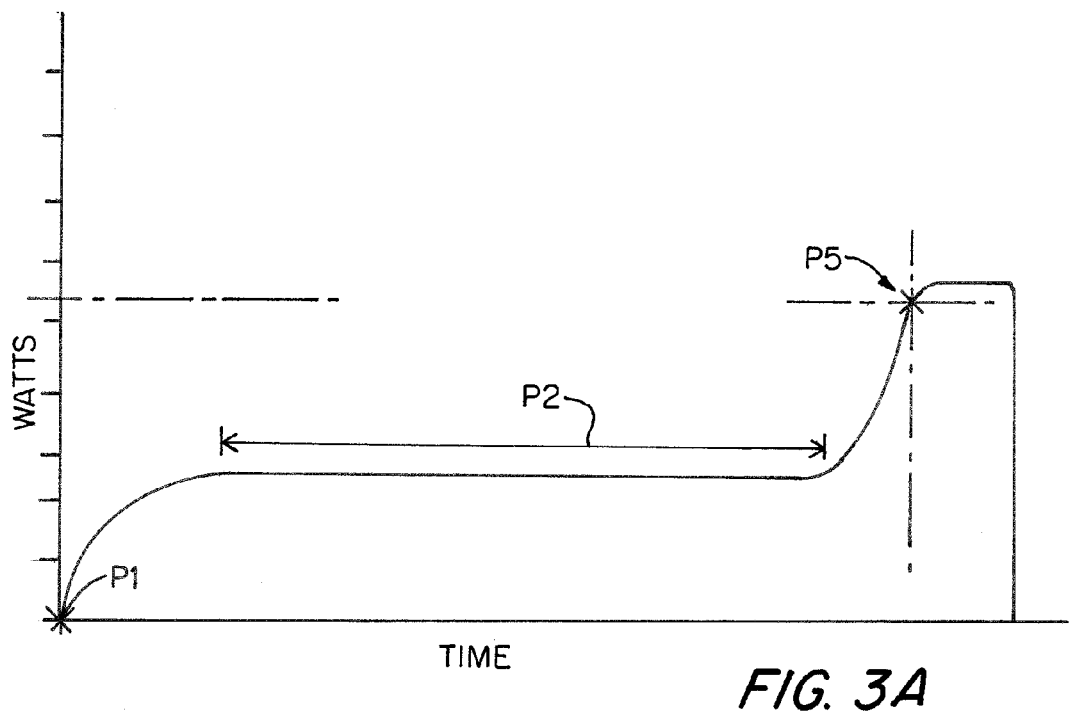
FIGS. 3A and 3B graphically illustrate, respectively, power requirement versus time and distance travelled versus time of an ultrasonic staking operation in accordance with an embodiment of the present invention.
Figure 3B:
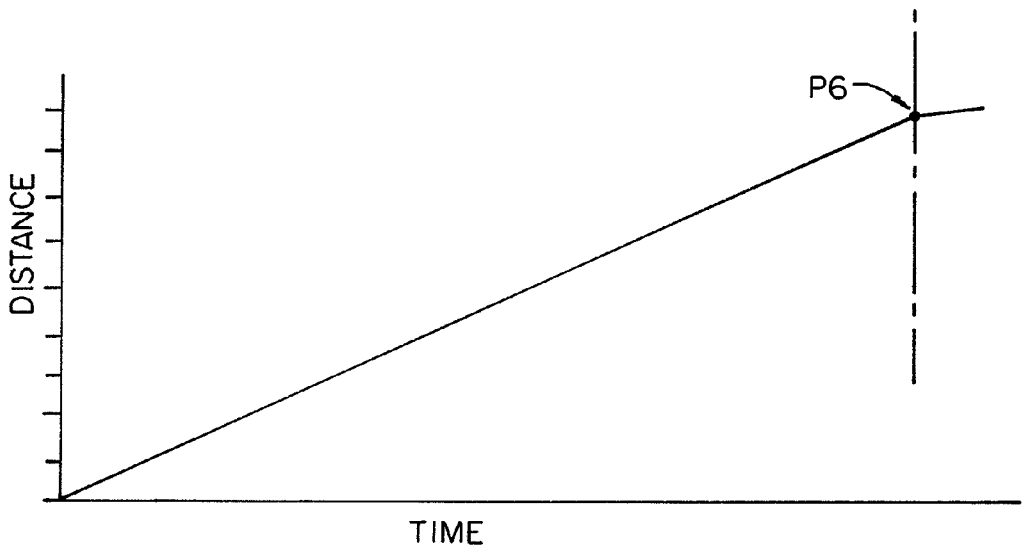
Figure 4:
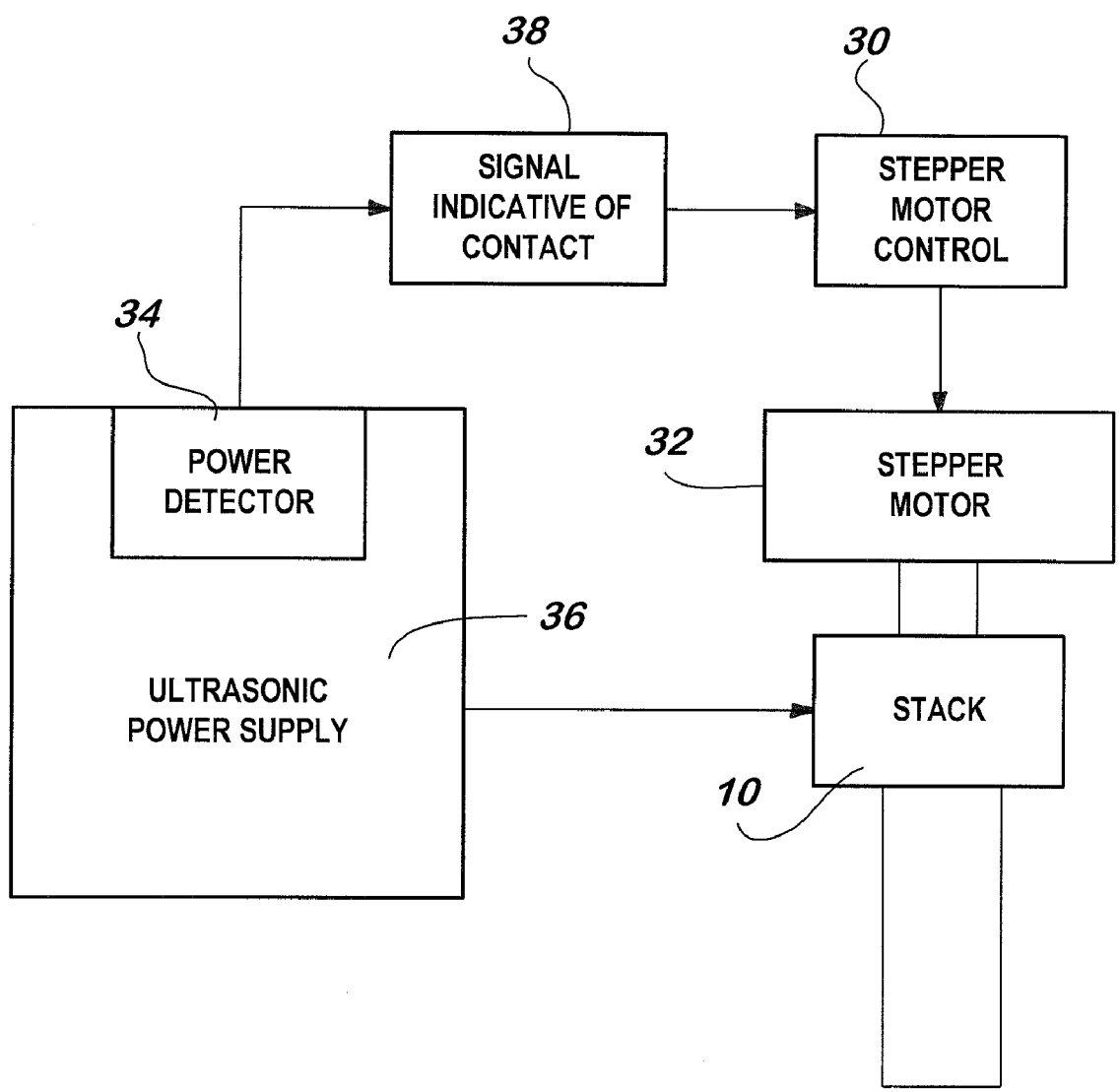
FIG. 4 schematically illustrates a system for preventing overloads in the staking operation graphically illustrated in FIGS. 3A and 3B.

We have discovered that a better solution allowing a lower wattage power supply without penalizing the time required to complete the weld is to "detect" the contact point where the horn 14 hits the upper surface of the second plastic part 22 and to reduce the motor speed as required to limit the applied power below the overload level. FIGS. 3A and 3B show the result of reducing the travel speed and the direct effect on the applied power. This allows a low wattage supply to be used for the staking application. FIG. 4 schematically shows a system for implementing the scheme shown in FIGS. 3A and 3B.

The weld can be terminated at contact or shortly afterward to make a proper witness ring or continue at the slower speed to a specific depth. Moreover, the speed used for melting the post can be increased to reduce the time and compensate for the slower speed at the end of the weld, thereby allowing the weld to be created in the same time, or even a shorter time, as compared to prior art systems.

Surface contact between the end of the horn 14 and the surface of the second plastic part 22 can be identified electronically by detecting the increased power level as the horn contacts the surface. The detection level must be between the power level used for melting the post 16 (indicated by P2 in FIGS. 2A and 3A) and the overload level (indicated by P4 in FIG. 2A). Detection must happen quickly enough so that the output detect signal can be used by the motion or pressure control 30 to reduce the speed of the stepper motor 32 quickly enough to prevent the power from getting to the overload level.

This detect setpoint (indicated by P5 in FIG. 3A) is determined through experimentation with the horns, materials, speeds and ultrasonic amplitude settings. The function of the detector 34 may be implemented, for example, by a comparator on the ultrasonic power supply 36, although other mechanisms for detection are also possible. The detector output 38 indicates that the power has climbed above the setpoint and the stepper motor system should use a reduced speed (indicated by P6 in FIG. 3B) for the remainder of the weld cycle. As shown in FIG. 3A, this reduced speed causes a corresponding drop in the power level requirements of the power supply, such that the sharp spike resulting in power overload (shown in FIG. 2A) never occurs.

This detector 34 may be configured with an adjustable trip point (indicated by P5), which enables the power level to be set to best match the particular application at hand. The detector output 38 is used by the motion control system 30 to slow the advance of the stack 10 and reduce the rate at which the power is increasing in time to prevent any overload tendencies.

Another benefit of this technique is that the distance for each post to be welded does not need to be determined. It is only necessary that the travel setting be farther than the longest weld. The system can be set to terminate at contact so the PLC control requirements are reduced to shutting off ultrasonics as soon as possible after contact. The result is faster welds at reduced time with a lower wattage power supply.

It should be appreciated by those skilled in the art that various changes and modifications can be made to the illustrated embodiments without departing from the spirit of the present invention. All such modifications and changes are intended to be covered within the scope of the present invention disclosure.

What is claimed is:

1. A system for performing an ultrasonic staking operation in order to join a first part having a post protruding therefrom and a second part having a hole through which the post is passed, said system comprising:
    a horn having an end vibrating at a frequency in the ultrasonic range;
    a motion system operatively connected to said horn, said motion system being capable of selectively moving said horn toward and away from the first and second parts;
    wherein said motion system moves said horn, with the end of said horn in contact with the post, toward the first and second parts at a first speed such that the ultrasonic vibrations of the end of said horn cause melting of the post; and
    wherein, once a determination is made that the end of said horn has contacted a surface of the second part surrounding the hole, said motion system moves said horn toward the first and second parts at a second speed, the second speed being slower than the first speed.

2. The system of claim 1 further comprising a power supply that supplies power necessary to cause the ultrasonic vibrations of the end of said horn.

3. The system of claim 2 wherein the determination that the end of said horn has contacted a surface of the second part surrounding the hole is made based upon a level of power required of the power supply in order to maintain the ultrasonic vibrations of the end of said horn.

4. The system of claim 3 wherein the determination that the end of said horn has contacted a surface of the second part surrounding the hole is made when the level of power required of the power supply in order to maintain the ultrasonic vibrations of the end of said horn is higher than a threshold value.

5. The system of claim 4 wherein the threshold value is variable by a user of said system.

6. The system of claim 3 wherein said power supply comprises a power detector and wherein the determination that the end of said horn has contacted a surface of the second part surrounding the hole is made by said power detector.

7. The system of claim 6 wherein said power detector comprises a comparator.

8. The system of claim 1 wherein said motion system comprises a stepper motor.

9. The system of claim 1 wherein amplitude and frequency of the ultrasonic vibrations of the end of said horn are kept substantially constant during an entirety of the ultrasonic staking operation.

10. A system for performing an ultrasonic staking operation in order to join a first part having a post protruding therefrom and a second part having a hole through which the post is passed, said system comprising:
    a horn having an end vibrating at a frequency in the ultrasonic range, wherein amplitude and frequency of the ultrasonic vibrations of the end of said horn are kept substantially constant during an entirety of the ultrasonic staking operation;
    a power supply that supplies power necessary to cause the ultrasonic vibrations of the end of said horn, said power supply comprising a power detector sensing an amount of power required to maintain the ultrasonic vibrations of the end of said horn;
    a motion system operatively connected to said horn, said motion system being capable of selectively moving said horn toward and away from the first and second parts;
    wherein said motion system moves said horn, with the end of said horn in contact with the post, toward the first and second parts at a first speed such that the ultrasonic vibrations of the end of said horn cause melting of the post if the amount of power required to maintain the ultrasonic vibrations of the end of said horn is below a threshold value; and
    wherein said motion system moves said horn toward the first and second parts at a second speed, the second speed being slower than the first speed, if the amount of power required to maintain the ultrasonic vibrations of the end of said horn is at or above the threshold value.

11. The system of claim 10 wherein the threshold value is indicative of a determination that the end of said horn has contacted a surface of the second part surrounding the hole.

12. The system of claim 10 wherein the threshold value is variable by a user of said system.

13. The system of claim 10 wherein said power detector comprises a comparator.

14. The system of claim 10 wherein said motion system comprises a stepper motor.

15. A method for performing an ultrasonic staking operation in order to join a first part having a post protruding therefrom and a second part having a hole through which the post is passed, said method comprising the steps of:
    vibrating an end of a horn at a frequency in the ultrasonic range;
    moving the horn, with the end of the horn in contact with the post, toward the first and second parts at a first speed such that the ultrasonic vibrations of the end of the horn cause melting of the post;
    determining when the end of the horn has contacted a surface of the second part surrounding the hole; and
    moving, once it has been determined that the end of the horn has contacted a surface of the second part surrounding the hole, the horn toward the first and second parts at a second speed, the second speed being slower than the first speed.

16. The method of claim 15 further comprising the step of supplying, with a power supply, power necessary to perform the vibrating step.

17. The method of claim 16 wherein the determining step is performed based upon a level of power required of the power supply in order to perform the vibrating step.

18. The method of claim 17 wherein the determining step comprises the step of determining when the level of power required of the power supply in order to perform the vibrating step is higher than a threshold value.

19. The method of claim 15 wherein the vibrating step comprises the step of vibrating an end of a horn at a frequency in the ultrasonic range with an amplitude and frequency that are kept substantially constant during an entirety of the ultrasonic staking operation.

20. A method for performing an ultrasonic staking operation in order to join a first part having a post protruding therefrom and a second part having a hole through which the post is passed, the method comprising the steps of:

vibrating an end of a horn at a frequency in the ultrasonic range, with an amplitude and frequency that are kept substantially constant during an entirety of the ultrasonic staking operation;

supplying power, with a power supply, necessary to perform the vibrating step;

sensing an amount of power required of the power supply to perform the vibrating step;

moving the horn, with the end of the horn in contact with the post, toward the first and second parts at a first speed such that the ultrasonic vibrations of the end of the horn cause melting of the post if the sensed amount of power is below a threshold value; and moving the horn toward the first and second parts at a second speed, the second speed being slower than the first speed, if the sensed amount of power is at or above the threshold value.

\* \* \* \* \*